(12) United States Patent
Aguiar Camara et al.

(10) Patent No.: US 11,047,509 B2
(45) Date of Patent: Jun. 29, 2021

(54) METHOD OF HANGING-OFF FLEXIBLE ELONGATE ELEMENTS DURING SUBSEA OPERATIONS, HANG-OFF INSERT AND LINK THEREFOR

(71) Applicant: Subsea 7 do Brasil Servicos Ltda, Niteroi (BR)

(72) Inventors: Marcelo Aguiar Camara, Rio de Janeiro (BR); Joao Luiz Vaz Coelho, Belford Roxo (BR); Francisco Carlos De Souza Santos, Niteroi (BR); Luiz Carlos De Lemos Junior, Rio de Janeiro (BR); Andre Azevedo, Rio de Janeiro (BR); Jaime Andres Berrio Henao, Rio de Janeiro (BR); Marcio Nogueira Barcellos, Rio de Janeiro (BR); Danilo De Hollanda Fernandes, Rio de Janeiro (BR)

(73) Assignee: Subsea 7 do Brasil Servicos Ltda Niteroi, Rio de Janeiro (BR)

( * ) Notice: Subject to any disclaimer, the term of this patent is extended or adjusted under 35 U.S.C. 154(b) by 0 days.

(21) Appl. No.: 16/077,995

(22) PCT Filed: Feb. 14, 2017

(86) PCT No.: PCT/BR2017/050032
§ 371 (c)(1),
(2) Date: Aug. 14, 2018

(87) PCT Pub. No.: WO2017/139861
PCT Pub. Date: Aug. 24, 2017

(65) Prior Publication Data
US 2021/0003232 A1    Jan. 7, 2021

(30) Foreign Application Priority Data
Feb. 17, 2016 (GB) .................................. 1602800

(51) Int. Cl.
*F16L 1/235* (2006.01)
*B63B 35/03* (2006.01)
*F16L 1/20* (2006.01)

(52) U.S. Cl.
CPC ............... *F16L 1/235* (2013.01); *F16L 1/207* (2013.01); *B63B 35/03* (2013.01)

(58) Field of Classification Search
CPC .. B63B 35/03; F16L 1/235; F16L 1/20; F16L 1/23; F16L 1/207; E21B 19/10; E21B 19/24
See application file for complete search history.

(56) References Cited

U.S. PATENT DOCUMENTS 6,328,188 B1 * 12/2001 Boznos et al. ......... A44C 5/107
224/164
6,378,399 B1    4/2002 Bangert
(Continued)

FOREIGN PATENT DOCUMENTS

| AU | 20100338125 B2 | 7/2011 |
| GB | 2492402 | 1/2013 |
| WO | WO 2011/080459 A1 | 7/2011 |

*Primary Examiner* — Tara Mayo-Pinnock
(74) *Attorney, Agent, or Firm* — Levy & Grandetti

(57) ABSTRACT

A hang-off insert for hanging-off a flexible elongate subsea element from a surface vessel has a circular loop that includes circumferentially-spaced support segments. Collectively, the segments define a substantially planar support face of the insert and have respective radially inner faces that define an inner radius of the loop. The radially inner faces of the support segments can be positioned at various radial positions to determine the inner radius of the loop and hence to adapt the circumference of the loop to suit different diameters of elongate subsea elements. With the hang-off insert supported by a hang-off structure of the vessel, a laterally-protruding hang-off feature of the elongate subsea element extending through the loop may be rested on the (Continued)

support face to transfer suspended weight loads to the hang-off structure.

31 Claims, 6 Drawing Sheets

(56) References Cited

U.S. PATENT DOCUMENTS 6,450,385 B1    9/2002  Guerin
2019/0376619 A1*  12/2019  Vehmeijer et al. ..... F16L 1/202

* cited by examiner

METHOD OF HANGING-OFF FLEXIBLE ELONGATE ELEMENTS DURING SUBSEA OPERATIONS, HANG-OFF INSERT AND LINK THEREFOR

BACKGROUND OF THE INVENTION

This invention relates to supporting a flexible elongate element from a surface vessel during an offshore operation. An example of such an element is a flexible subsea pipeline or an umbilical that hangs as a catenary from a surface vessel toward the seabed during installation. In the art of subsea operations, supporting such an element may be referred to as 'hanging off' or 'holding back', depending upon the phase of the installation operation.

Flexible elongate elements are most commonly laid underwater by an installation vessel that firstly spools the element onto a reel or carousel. During installation offshore, the elongate element is unspooled from the reel or carousel and is then overboarded into the sea to hang from the vessel as a catenary. Between unspooling and overboarding, the elongate element may pass through or over various items of equipment that guide the element and that may contribute to hold-back tension, such as tensioners, a tower, a chute or a ramp.

Frictional hold-back devices such as tensioners or friction clamps can be used to support the suspended weight of an elongate element. However, the reliance of such devices upon friction means that there is nothing else to hold the elongate element if it starts to slip through the device, for example because the outer surface of the elongate element has a poor surface finish or is wet or oily. Also, hold-back devices have to be moved away from the launch axis of the elongate element to allow laterally-protruding equipment that is wider than the remainder of the elongate element, such as accessories or modules, to be attached to the elongate element and to allow such equipment to bypass the hold-back device in the launch direction.

GB 2492402 describes a hang off clamp comprising two discrete segments that can be disconnected to allow subsea structures and assemblies to pass along the lay path.

U.S. Pat. No. 6,450,385 describes a clamping ring for laying oil ducts, the clamping ring comprising an assembly of vertical jaws that can be moved in synchrony.

Installation of flexible elongate elements on the seabed in deep water requires the installation vessel to have sufficient hang-off capacity to support the weight of the long catenary that is suspended in the water column between the vessel and the seabed. Usually, hang-off systems are used to keep the upper end of an elongate element supported at deck level for connection to equipment such as in-line modules before deployment and also for connection between ends of pipeline sections during an installation campaign. In those situations, an elongate element has to be suspended temporarily without moving in the launch direction.

It is conventional for a laterally-protruding hang-off feature of an elongate element to be engaged mechanically with a hang-off plate or bushing on the pipelaying vessel. The laterally-protruding hang-off feature that abuts a shoulder of the hang-off bushing may be a flanged collar or another item of equipment that is wider than the remainder of the elongate element, such as an accessory or a module attached to the elongate element. This provides a steady and reliable mechanical connection between the elongate element and the laying equipment of the vessel.

For example, a hang-off collar may be a metallic part of the elongate element that defines a radially-projecting flange or ring. Examples are a forged radially-projecting ring that is incorporated into the elongate element, or forgings comprising such rings that are attached to an end of the elongate element or incorporated at intervals along the elongate element. Other specific examples of equipment that has a greater diameter than the remainder of the elongate element are a connector, an end-fitting or an armour pot.

An example of a hang-off system known in the prior art is shown in FIG. 1 of the accompanying drawings, in longitudinal sectional view. An elongate element 10 that is exemplified here as a flexible pipeline extends along a generally vertical launch axis as it passes through the hang-off system 12. The hang-off system 12 comprises a tubular support structure 14 whose inner opening flares downwardly to accommodate bending of the elongate element 10.

The elongate element 10 carries an armour pot 16 as an example of a hang-off feature that protrudes laterally, in at least one generally radial direction. The elongate element 10 further comprises a vertebrae bend restrictor 18 extending from the armour pot 16.

The open top of the tubular support structure 14 is closed by a hang-off bushing 20 that is assembled in two halves around the elongate element 10 and so has a central hole 22 to accommodate the elongate element 10.

A simple hang-off bushing 20 like that shown in FIG. 1 can only accommodate one diameter of elongate element 10: in other words, a hang-off bushing 20 cannot be purpose-designed as a universal hang-off insert for all such elongate elements 10. Consequently, it is conventional to use one of a selection of split hang-off inserts 24 as an adaptor between a specific elongate element 10 and a hang-off bushing 20. The inner edge region of the hang-off bushing 20 around the central hole 22 serves as a shoulder upon which the hang-off insert 24 rests.

The hang-off insert 24 is made of semi-circular or half-moon parts machined from steel, whose internal curvature matches the external curvature of a particular elongate element 10. The two parts of the hang-off insert 24 are bolted together around the elongate element 10 to lie between the elongate element 10 and the hang-off bushing 20. The armour pot 16 sits on the hang-off insert 24. This transfers the weight of the elongate element 10 to the hang-off bushing 20 through the hang-off insert 24.

As noted above, the armour pot 16 is just an example of a hang-off feature protruding laterally from the elongate element 10. Such a feature may be provided by any other equipment that has a greater diameter than the remainder of the elongate element 10, such as an end fitting of the elongate element 10 or a buoyancy module clamped to the elongate element 10, or by a flanged collar protruding radially from the elongate element 10.

An installation vessel may have to cater for elongate elements 10 of many different diameters during routine operations. Each diameter of elongate element 10 requires a different hang-off insert 24. Consequently, around fifty different hang-off inserts 24 may be required per vessel. This involves a high cost of design and fabrication and requires a large area of deck space on the vessel to store multiple hang-off inserts 24 onboard. Alternatively, there is a risk of expensive downtime to fabricate or obtain a specific hang-off insert 24 if such an insert is not kept onboard.

AU 2010/338125 describes an insert comprising several sectors that can be spaced at varying intervals around a flexible pipe extending through a holding table.

BRIEF SUMMARY OF THE INVENTION

Against this background, one aspect of the invention resides in a method of hanging-off a flexible elongate subsea element from a surface vessel. The method comprises: placing a hang-off insert onto a hang-off structure of the surface vessel, the hang-off insert comprising a substantially circular loop whose inner radius is defined by radially inner faces of support segments spaced circumferentially around the loop; and with the hang-off insert supported by the hang-off structure and the elongate subsea element extending through the loop, resting a laterally-protruding hang-off feature of the elongate subsea element on a substantially planar support face defined collectively by the support segments to transfer weight of the elongate subsea element suspended from the surface vessel to the hang-off structure.

A flexible hang-off insert may be bent around the elongate subsea element to form the loop, in which case the method may further comprise securing together opposed ends of the flexible hang-off insert to close the loop. Tension may be imparted in the loop by compressing the elongate subsea element within the loop.

The hang-off insert is preferably adapted by adjusting the inner radius of the loop to suit an outer radius of the elongate subsea element. For example, the method may comprise adjusting radial positions of at least the radially inner faces of the support segments to adjust the inner radius of the loop. Radial movement of pads of the support segments may adjust the inner radius of the loop. Another approach to adjusting the inner radius of the loop is to vary a length of at least one member between the support segments. In that case, the method may involve varying circumferential spacing between at least two of the support segments when adjusting the inner radius of the flexible loop.

The loop may comprise a circumferential series of interengaged links that are added or removed to adjust the inner radius of the loop. For example, links may be added or removed from at least one articulated flexible member between support segments. Conveniently, interengaged links may pivot relative to each other when closing the loop around the elongate subsea element, suitably pivoting about pivot axes that are generally orthogonal to the support lace of the insert.

Links may be engaged or disengaged by relative movement between the links along the pivot axes, but interengaged links may be locked against relative movement between the links along the pivot axes. For example, a retaining member may be engaged with interengaged engagement formations of successive links to lock those links against relative movement along the pivot axes.

The hang-off insert may be adapted by assembling the insert such that the inner radius of the loop suits an outer radius of the elongate subsea element.

The inventive concept embraces a hang-off insert for hanging-off a flexible elongate subsea element from a hang-off structure of a surface vessel. The insert comprises a substantially circular loop that can be placed around an elongate subsea element extending through the hang-off structure in use, the loop comprising a plurality of circumferentially-spaced support segments that collectively define a substantially planar support face of the insert, the support segments each having a radially inner face oriented to face toward the elongate subsea element in use. The radially inner faces of the support segments collectively define an inner radius of the loop and at least the radially inner faces of the support segments are positionable at various radial positions with respect to a central axis of the loop to determine the inner radius of the loop. The plane of the support face preferably extends substantially orthogonally with respect to the central axis of the loop.

The loop suitably comprises a connector having two parts that are connectable together to close the loop. Elegantly, the connector may be one of the support segments. Preferably at least one tensioning element such as a bolt imparts tension to the loop by forcing the two parts of the connector toward each other.

The loop preferably comprises a circumferential series of interengaged links that can be added or removed to adjust the inner radius of the loop, which links advantageously include the support segments.

Mutually interlocking formations of the links are preferably elongated in a direction that is generally orthogonal to the support face of the insert, and suitably have substantially constant cross-sections in that direction. This facilitates engagement or disengagement by relative movement between the links in that direction. A locking member may act between interengaged links to restrain relative movement between the links in that direction.

When interengaged, links are preferably pivotable relative to each other to confer flexibility and adaptability on the insert. Conveniently, the interengaged links are pivotable about pivot axes that are generally orthogonal to the support face of the insert.

For the purpose of interengagement, each link may comprise a tongue at one end and a complementary groove at an opposite end that face in mutually-opposed circumferential directions when the links are assembled in the loop.

Preferably, the substantially planar support face of the insert extends substantially continuously around the loop and between the support segments. For this purpose, the support segments and members of the loop connecting the support segments may each comprise an upper face forming part of the support face of the insert and a lower face parallel to and spaced from the upper face, the spacing between the parallel upper and lower faces being substantially identical for each support segment and for each member that connects the support segments.

To maximise their supporting area, the support segments may extend radially outwardly with respect to the members that connect the support segments.

The loop may comprise a flexible band, which band is preferably flexible to be bent in a plane that is orthogonal to the central axis of the loop but that is stiff to resist bending in directions that are orthogonal to that plane. Alternatively, the loop may comprise a rigid ring.

It is possible for the support segments to include radially-movable pads that define the radially inner faces of the support segments.

The inventive concept also embraces a link for a hang-off insert, the link comprising a substantially planar upper face and a substantially planar lower face parallel to and spaced from the upper face, a tongue extending between the upper and lower faces at one end and a groove, complementary to the tongue, extending between the upper and lower faces at an opposite end.

In summary, the invention provides a hang-off insert for hanging-off a flexible elongate subsea element from a surface vessel. The insert has a circular loop that comprises circumferentially-spaced support segments. Collectively, the segments define a substantially planar support face of the insert and have respective radially inner faces that define an inner radius of the loop. The radially inner faces of the support segments can be positioned at various radial positions to determine the inner radius of the loop and hence to adapt the circumference of the loop to suit different diameters of elongate subsea elements.

With the hang-off insert supported by a hang-off structure of the vessel, a laterally-protruding hang-off feature of the elongate subsea element extending through the loop may be rested on the support face to transfer suspended weight loads through the insert to the hang-off structure.

The invention solves the problem of providing a supporting interface between a hang-off plate or bushing and pipelines or other elongate elements that are not standardised and so may have various diameters.

The invention provides a versatile alternative to existing hang-off inserts. The insert of the invention can comply with a wide range of diameters of elongate elements that may be suspended from a hang-off module and ensures a reliable mechanical interface between equipment of the elongate element and the hang-off module.

The hang-off insert of the invention is an adjustable-diameter collar made of links to be assembled according to the dimensions required for the collar on a project-by-project basis.

The hang-off insert of the invention has to withstand a substantial crushing load and so suitably comprises blocks that are at least partially rigid, which blocks are connected together with an interface that has variable circumferential length and therefore diameter. Practically, the weight of the pipeline may be supported not only by the support blocks, but also by links between the support blocks though only bases of the support blocks need to transfer the load to the hang-off plates of a hang-off bushing. To avoid damage, the links must be stiff and must not rotate in radial directions: the only authorised rotation of and between links is around axes that will be vertical in use.

Thus, in preferred embodiments, the invention provides a compression insert comprising at least two, more preferably at least three, radially-extending support bases and other links that can be coupled together. The support bases can be coupled to the other links and the diameter of the insert can be adjusted by adding or removing links. The inner diameter of the compression insert is suitably substantially circular. Each support base may comprise at least one compression-resistant block that extends radially away from the inner diameter.

Each link is suitably a compression-resistant solid part that preferably comprises at least one male formation and at least one female formation. Those formations may be inter-locked with complementary counterpart formations of adjacent links. At least one of the links may comprise a lockable split mechanism to open and close the compression insert.

Advantageously, the male and female formations are elongated in the axial direction, which direction will typically be vertical in use and so is orthogonal to a plane in which the compression insert extends as a ring in use. Their axial elongation allows a male formation of a first link to be coupled to a female formation of a second adjacent link by sliding in the axial direction. Also, the resulting coupling between two successive links allows only one degree of freedom, which is rotation around the axial direction. At least one of the links suitably comprises a locking element that then prevents sliding between the male and female formations in the axial direction to hold the adjacent links together.

In preferred aspects, the invention provides a method temporarily to suspend a flexible pipeline or other elongate element from a pipelay vessel. The method may comprise: adjusting the diameter of a compression insert that comprises links coupled together and at least two radially-extending support bases coupled to the links; installing the compression insert in a hang-off module of the installation vessel; lowering the flexible pipeline or other elongate element through the hang-off module; and abutting an accessory of the flexible pipeline or other elongate element on the compression insert.

BRIEF DESCRIPTION OF THE SEVERAL VIEWS OF THE DRAWINGS

Reference has already been made to FIG. 1 of the drawings, which is briefly described immediately below, to illustrate a hang-off system known in the prior art. In order that the invention may be more readily understood, reference will now be made, by way of example, to the remainder of the accompanying drawings, in which.

DETAILED DESCRIPTION OF THE INVENTION

Figure 1:
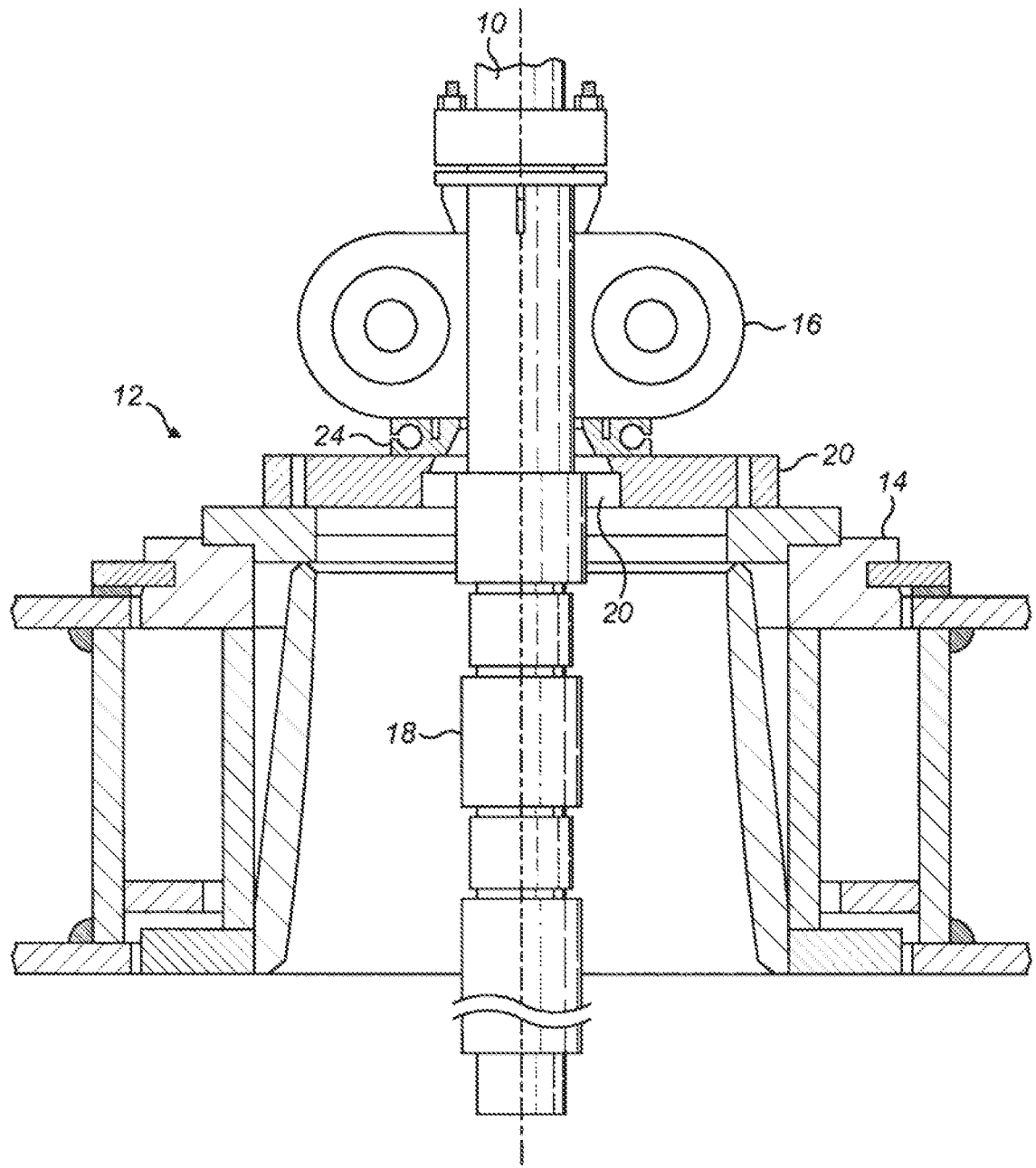
FIG. 1 is a longitudinal sectional view of a hang-off system known in the prior art.
Figure 2:
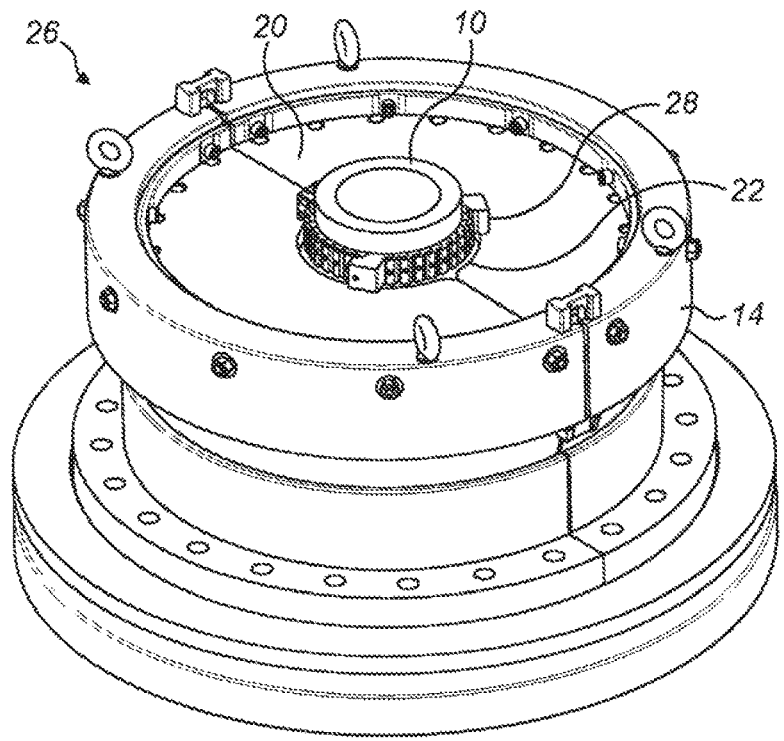
FIG. 2 is a top perspective view of a hang-off system using a hang-off insert of the invention to support an elongate element exemplified by a flexible pipe.

FIG. 2 shows a hang-off system 26 that has been adapted by the use of a hang-off insert 28 in accordance with the invention, in place of the rigid split hang-off insert 24 of the prior art as shown in FIG. 1. Otherwise, the hang-off system 26 is similar to the prior art hang-off system 12 shown in FIG. 1, so like numerals are used for like parts.

The hang-off insert 28 is tightened around and encircles an elongate element 10, again exemplified here as a flexible pipeline of circular cross-section that extends along a generally vertical launch axis as it passes through the hang-off system 26.

As in the hang-off system 12 shown in FIG. 1, the hang-off system 26 shown in FIG. 2 comprises a tubular support structure 14 whose open top may be closed by a hang-off bushing 20 that is assembled in two halves around the elongate element 10. The hang-off bushing 20 has a central hole 22 to accommodate the elongate element 10.

The inner edge region of the hang-off bushing 20 around the central hole 22 serves as a shoulder upon which the hang-off insert 28 rests. In use of the invention, a laterally-protruding hang-off feature of the elongate element 10 such as an armour pot 16 as shown in FIG. 1 (which has been omitted from FIG. 2 for clarity) rests in turn on the hang-off insert 28 to transfer loads of the elongate element 10 through the hang-off insert 28 to the hang-off bushing 20.

Figure 3:
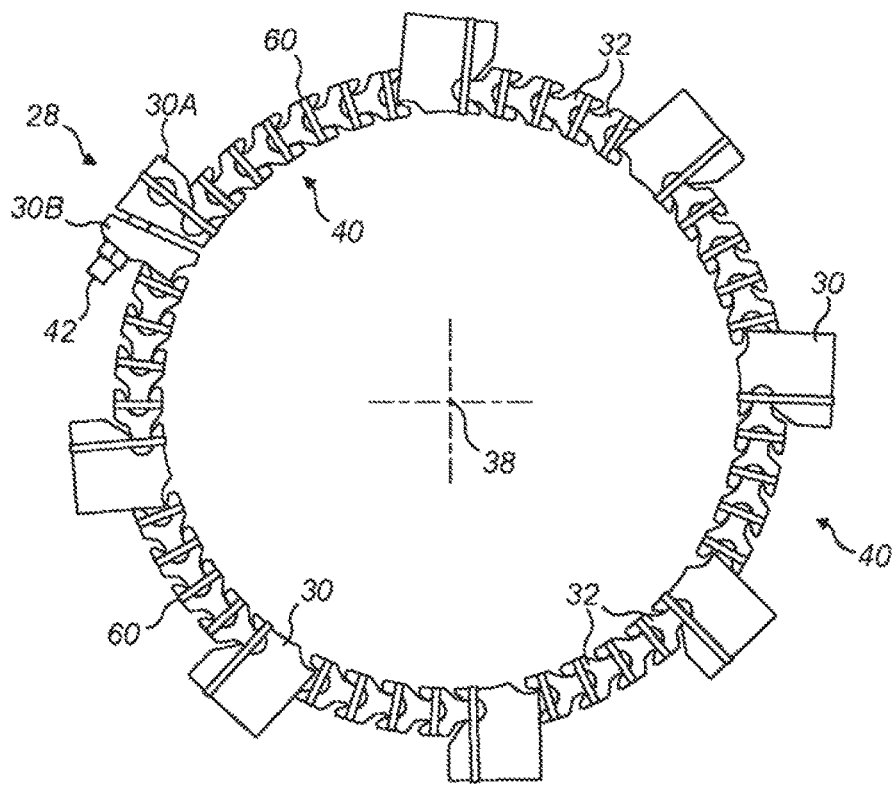
FIG. 3 is a sectional top plan view of a hang-off insert of the invention in a closed looped configuration as seen in FIG. 2.
Figure 4:
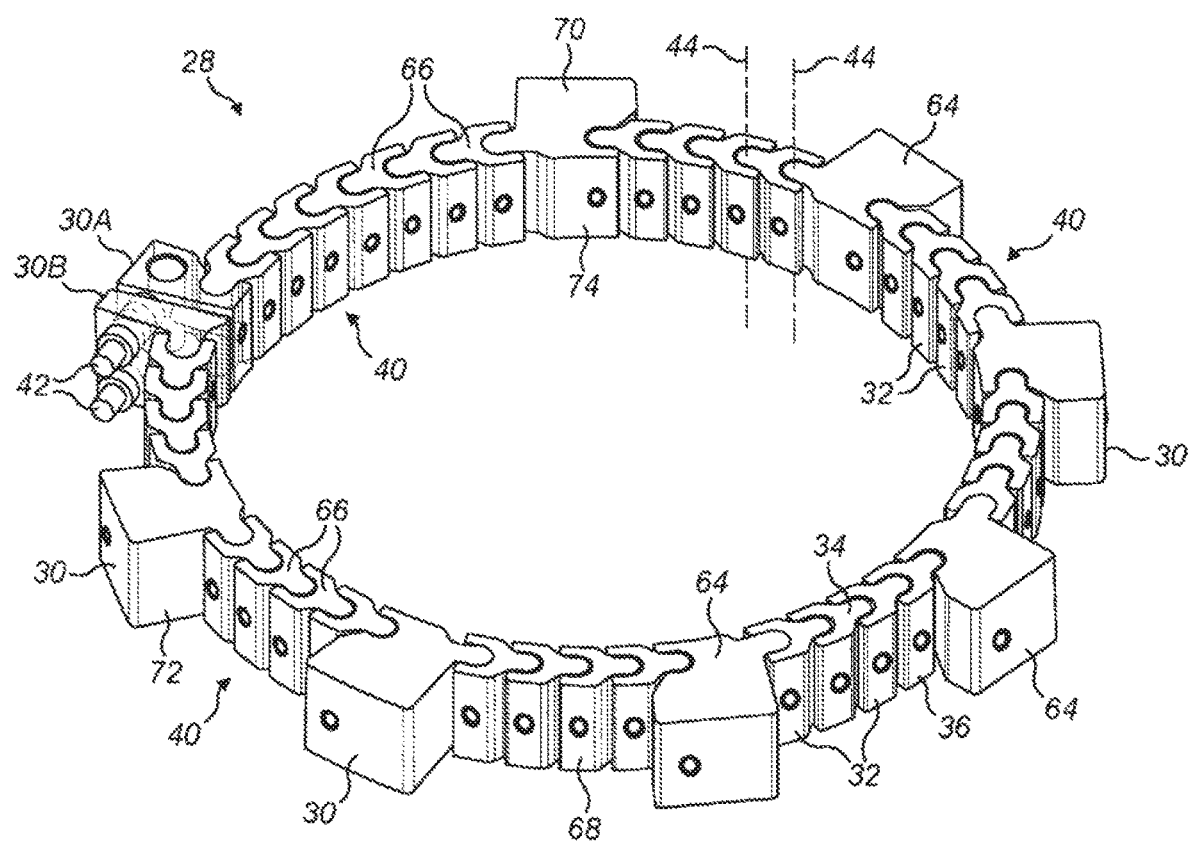
FIG. 4 is a top perspective view of the hang-off insert shown in FIG. 3.

FIGS. 3 and 4 show the complete hang-off insert 28 of the invention in isolation. The hang-off insert 28 is an articulated or segmented flexible band comprising various jointed links 30, 32 that are machined from steel and are joined successively end-to-end. In these drawings, opposed ends of the band of the hang-off insert 28 have been joined to each other to form a continuous circular loop that is sized to encircle a particular elongate element 10 of circular cross-section.

The hang-off insert 28 defines an upper support face 34 that interfaces with the armour pot 16 and a lower bearing face 36 that interfaces with the hang-off bushing 20. The upper support face 34 and the lower bearing face 36 are substantially planar and orthogonal to the intersecting central longitudinal axis 38 of the elongate element 10. Thus, the upper support face 34 and the lower bearing face 36 extend in substantially parallel planes.

The band of the hang-off insert 28 has sufficient articulation for its ends to be brought together to form a circular loop as shown in FIGS. 3 and 4 to encircle an elongate element 10 such as a flexible pipeline. The central axis of the circular loop formed by the closed band of the hang-off insert 28 then coincides with the central longitudinal axis 38 of the elongate element 10. The band also has sufficient articulation for its ends to be separated enough to open the loop so that the hang-off insert 28 can be placed around and removed from such an elongate element 10.

In accordance with the invention, the diameter of the loop can be adjusted simply by adding links 30, 32 to the band of the hang-off insert 28 or by removing links 30, 32 from that band. Also, fine adjustment of the diameter of the loop is possible by adjusting the gap between the opposed ends of the band of the hang-off insert 28 when those ends are coupled to each other to close the loop. In these ways, a single hang-off insert 28 can be tailored to handle a range of different elongate elements 10, which previously, and disadvantageously, required multiple rigid hang-off inserts 24 of the prior art as shown in FIG. 1.

The links 30, 32 that form the band of the hang-off insert 28 comprise a plurality of spaced-apart support blocks 30 and a greater plurality of vertebrae 32 between the support blocks 30. In effect, groups of vertebrae 32 are joined together in series to form flexible members 40 that connect the support blocks 30. Those flexible members 40 follow respective part-circular arcs between the support blocks 30 when the opposed ends of the band of the hang-off insert 28 are joined together to form a circular loop as shown in FIGS. 3 and 4. Conversely, the flexible members 40 straighten to open the loop so that the hang-off insert 28 can be placed around and removed from the elongate element 10 before and after use. Not all of the flexible members 40 need have the same number of vertebrae 32, as FIGS. 3 and 4 make clear.

In this example, one of the support blocks 30 is divided into two separable parts 30A and 30B to serve as a connector between the opposed ends of the band of the hang-off insert 28. The two parts 30A, 30B of the connector support block 30 are held together by tangentially-aligned parallel bolts 42 that, when tightened, place the hang-off insert 28 under tension around the elongate element 10, which in turn is subjected to compression. This tension helps to stiffen the hang-off insert 28 in use by resisting relative movement between adjacent links 30, 32 of the band. The two parts 30A, 30B of the connector support block 30 need not be brought together completely: to the contrary, it may be necessary for those parts 30A, 30B to remain slightly apart for the bolts 36 to be able to maintain tension in the band. Adjusting the gap remaining between the parts 30A, 30B allows fine adjustment of the diameter of the loop without necessarily adding or removing links 30, 32.

The band of the hang-off insert 28 is flexible to be bent in one plane, which plane is orthogonal to the intersecting central longitudinal axis 38 of the elongate element 10 and so will typically be horizontal in use. Conversely, the band is stiff to resist bending in directions that are orthogonal to that plane of bending, which directions are substantially parallel to the central longitudinal axis 38 and hence will typically be vertical in use.

This differential stiffness of the band of the hang-off insert 28 is assured by aligning pivot axes 44 between successive links 30, 32 to be substantially parallel to each other and substantially orthogonal to the plane in which the band is permitted to bend. Thus, the pivot axes 44 between the links 30, 32 will all be substantially vertical and hence substantially parallel to the intersecting central longitudinal axis 38 of the elongate element 10 when the hang-off insert 28 is in use.

Figure 5:
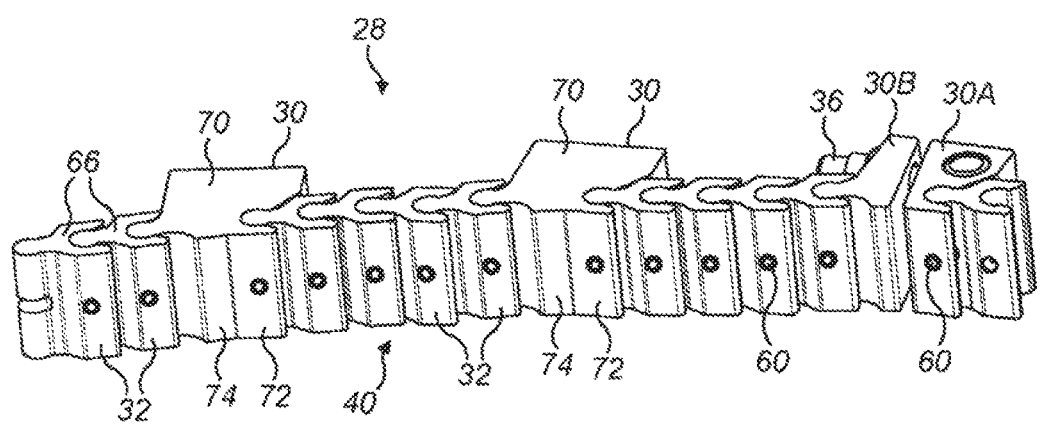
FIG. 5 is an enlarged perspective view of a portion of the hang-off insert shown in FIGS. 3 and 4, here in a relatively straight opened configuration.
Figure 6:
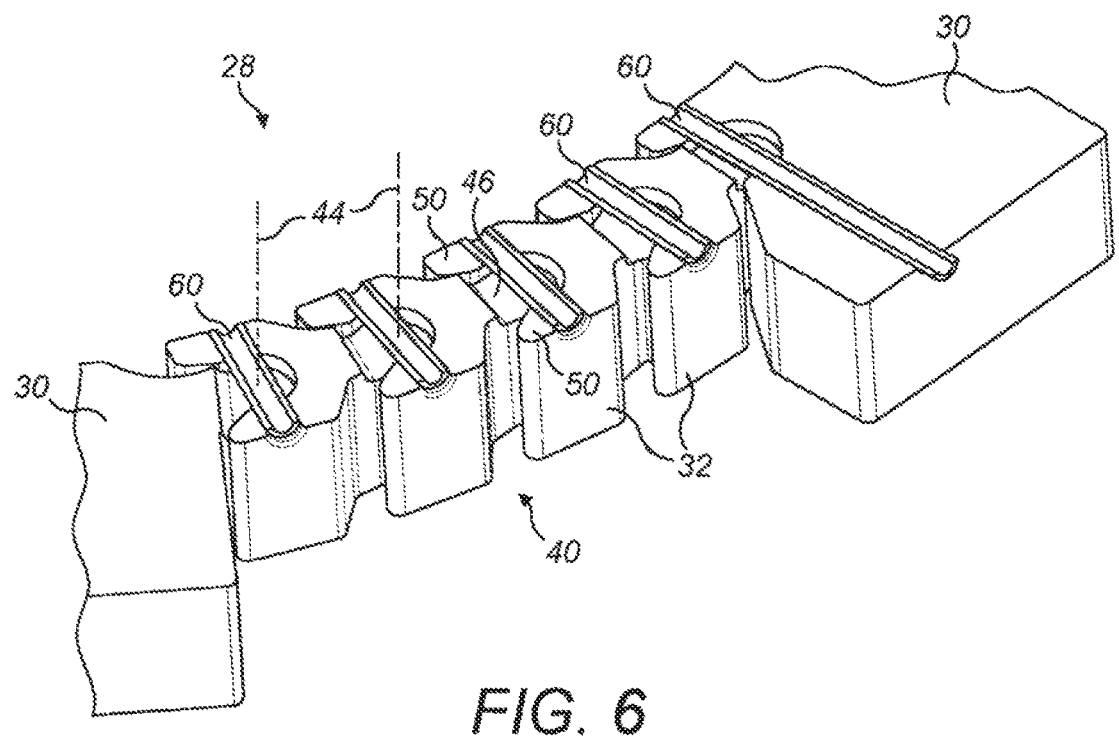
FIG. 6 is a further enlarged part-sectioned detail view of the hang-off insert shown in FIGS. 3, 4 and 5, in the closed looped configuration.

With reference now also to FIGS. 5 and 6 of the drawings, the pivot axes 44 are defined between pivotably-interlocking formations 46, 48 of the links 30, 32. Specifically, each of the support blocks 30 and each of the vertebrae 32 has a tongue 46 at one end and a complementary groove 48 at the opposite end. The connector support block 30 has a groove 48 in one of its parts 30A and a tongue 46 on the other of its parts 30B. Each groove 48 is defined between a pair of spaced legs 50 of each link 30, 32.

The tongue 46 and groove 48 of each link 30, 32 face in mutually-opposed circumferential directions when the links 30, 32 are assembled into a circular band. Thus, the tongue 46 of one link 30, 32 is pivotably engaged in the groove 48 of an adjacent link 30, 32, such that the tongues 46 can pivot within and relative to the associated grooves 48 about the respective pivot axes 44.

Figure 7A:
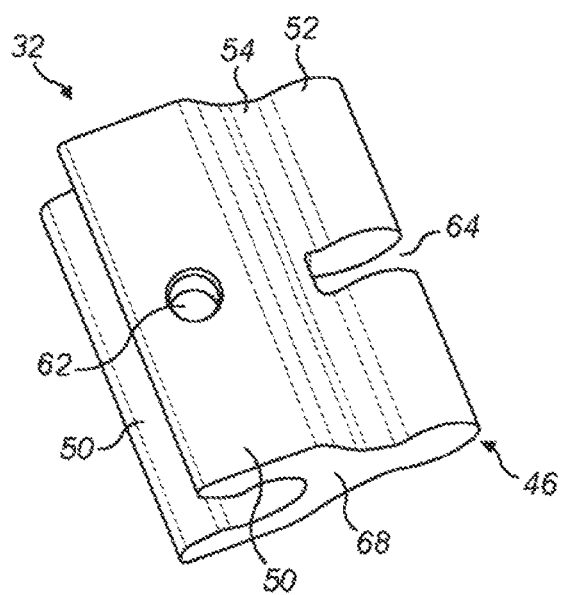
FIGS. 7a, 7b and 7c are a selection of views of a link of the hang-off insert of the invention.
Figure 7B:
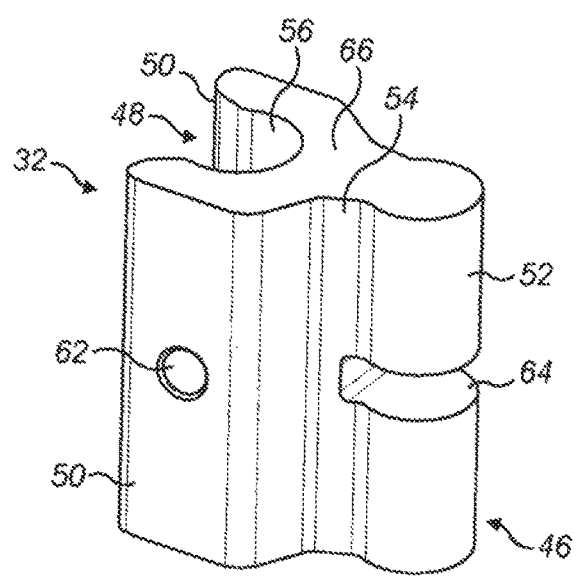
Figure 7C:
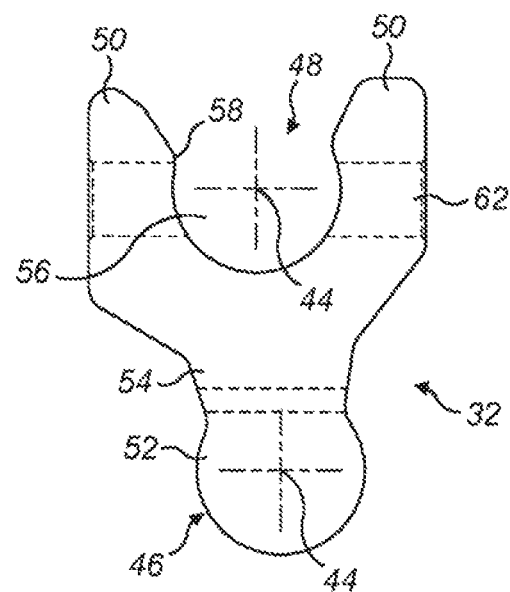

FIGS. 7a to 7c show one of the vertebrae 32 in isolation to explain the shapes and interaction of the tongue 46 and the groove 48 in more detail. It will be apparent that the tongues 46 and grooves 48 of the support blocks 30 have similar features and interact in the same way.

The tongues 46 and grooves 48 are elongated in directions parallel to the pivot axes 44 and have substantially constant cross-sections in those directions. Specifically, the tongues 46 of the links 30, 32 each comprise a part-cylindrical projection 52 of part-circular cross-section that extends around greater than 180° of arc to leave a narrower neck 54. Conversely, the complementary grooves 48 of the links 30, 32 each comprise a part-cylindrical recess 56 of part-circular cross-section that extends around greater than 180° of arc to leave a narrower mouth 58. The neck 54 is narrower than the mouth 58 to give clearance for relative pivotal movement of a tongue 46 in a groove 48.

The recess 56 of a groove 48 is slightly wider than the diameter of the projection 52 of a tongue 46, to the extent that the projection 52 is a sliding fit in the recess 56. However, the projection 52 of a tongue 46 is wider than the mouth 58 of a groove 48 so that the projection 52 is held in the recess 56 of the groove 48. Nevertheless, as the ends of the groove 48 are open, the tongue 46 can be slid out of the groove 48 by relative movement along the pivot axis 44 to uncouple adjacent links 30, 32.

Straight retaining pins 60 restrain the tongues 46 are from being slid out through the open ends of the grooves 48. The retaining pins 60 intersect and extend orthogonally to the pivot axes 44 and extend substantially radially in a common plane when the hang-off insert 28 is formed into a circular loop around the elongate element 10 for use. The radial orientations of the retaining pins 60 are best appreciated in the sectional plan view of FIG. 3, where the section is taken through the plane of the pins 60. The enlarged detail view of FIG. 6 is also sectioned in the same plane. Here, it is apparent that the retaining pins 60 need not be solid but may be hollow tubes.

Each retaining pin 60 extends across the recess 56 of a groove 48 and through aligned holes 62 in the legs 50 of the links 30, 32 that define the groove 48. In crossing the recess 56, a retaining pin 60 passes through and hence engages with a slot 64 in the projection 52 of a tongue 46 that is engaged in the recess 56. Thus, insertion of the retaining pin 60 through the holes 62 in the legs 50 that define the groove 48 locks the tongue 46 against movement relative to the groove 48 along the pivot axis 44. However, relative movement between the retaining pin 60 and the slot 64 remains possible so that the tongue 46 can still pivot in the groove 48.

A retaining pin 60 can be pushed or knocked out of the aligned holes 62 in the legs 50 that define the groove 48 to release the associated tongue 46 when uncoupling adjacent links 30, 32.

FIG. 7c best shows that the links 30, 32 exemplified here by a vertebra 32 are asymmetrical in such a way that a line between the pivot axes 44 of the tongue 46 and the groove 48 is not orthogonal to a line that joins the aligned holes 62 in the legs 50 that define the groove 48. Thus, when oriented and assembled for use to form a circular band of the hang-off insert 28 as best shown in FIG. 3, the tongue 46 of each link 30, 32 is offset slightly radially inwardly with respect to the groove 48 of that link 30, 32.

FIGS. 7a and 7b show that the vertebra 32 has parallel, flat upper and lower faces 66, 68 with which the pivot axes 44 shown in FIG. 7c intersect orthogonally. The spacing between the upper and lower faces 66, 68 defines the depth of the vertebra 32. Likewise, FIGS. 4 and 5 of the drawings show that the other links in the form of the support blocks 30 also have parallel, flat upper and lower faces 70, 72 with which their pivot axes 44 also intersect orthogonally. The spacing between the upper and lower faces 70, 72 defines the depth of the support blocks 30.

Each support block 30 also has a concave faceted face 74 on its radially inner side to seat against the convex external curvature of the elongate element 10 in use of the hang-off insert 28.

Advantageously, the depth of the vertebrae 32 and the depth of the support blocks 30 match each other so that their upper and lower faces 66, 70 and 68, 72 align in respective common planes. This allows all of the links 30, 32 to participate in bearing and sharing the suspended weight of the elongate element 10 in use. Thus, as best appreciated with reference to FIGS. 4 and 5, the upper and lower faces 66, 70 and 68, 72 cooperate to define substantially continuous parallel, flat load-transmitting surfaces on the upper and lower sides of the hang-off insert 28. These load-transmitting surfaces are the aforementioned upper support face 34 that interfaces with the armour pot 16 and the lower bearing face 36 that interfaces with the hang-off bushing 20.

FIGS. 4 and 5 also show that the tongue 46 and groove 48 of each support block 30 are offset toward the faceted face 74 on the radially inner side of the support block 30. Thus, when the band of the hang-off insert 28 is formed into a circular loop, the support block 30 extends radially outwardly with respect to the adjacent vertebrae 32 to maximise the supporting area of its upper and lower faces 70, 72.

In a variant of the embodiment described above, it would be possible for the upper support face 34 and/or the lower bearing face 36 of a hang-off insert instead to be discontinuous. For example, the upper support face 34 and the lower bearing face 36 could be defined by the upper and lower faces 70, 72 of the support blocks 30 all lying in respective planes, with the vertebrae 32 or other connecting members being of lesser height than the support blocks 30.

Figure 9:
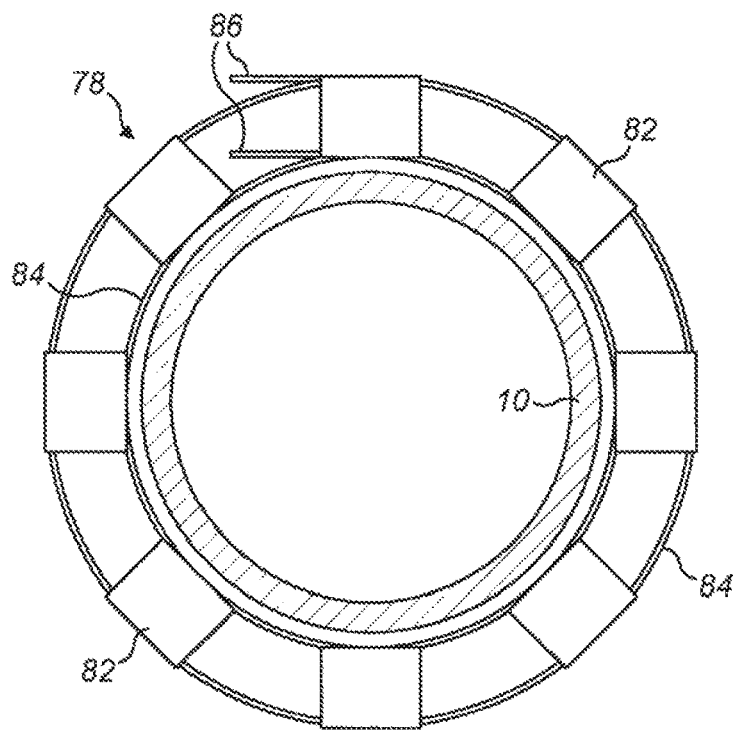
Figure 10:
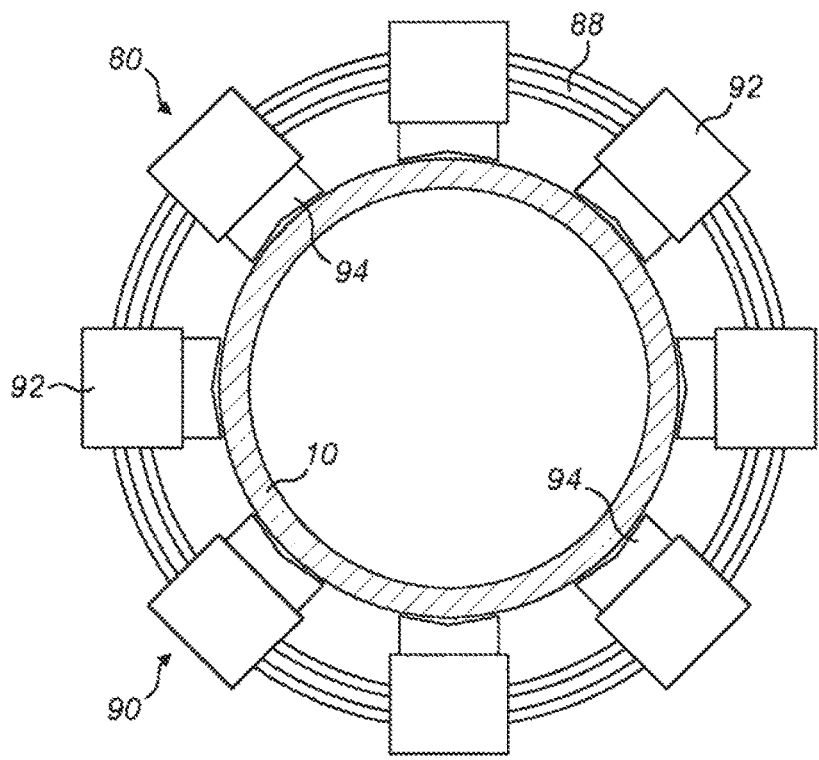

Other variations are possible within the inventive concept of a hang-off insert that can be adapted to suit different elongate elements of different diameters. Some examples are shown in FIGS. 8 to 10 of the drawings, which show variant hang-off inserts 76, 78, 80 respectively, encircling an elongate element 10 that is exemplified again by a flexible pipe.

Figure 8:
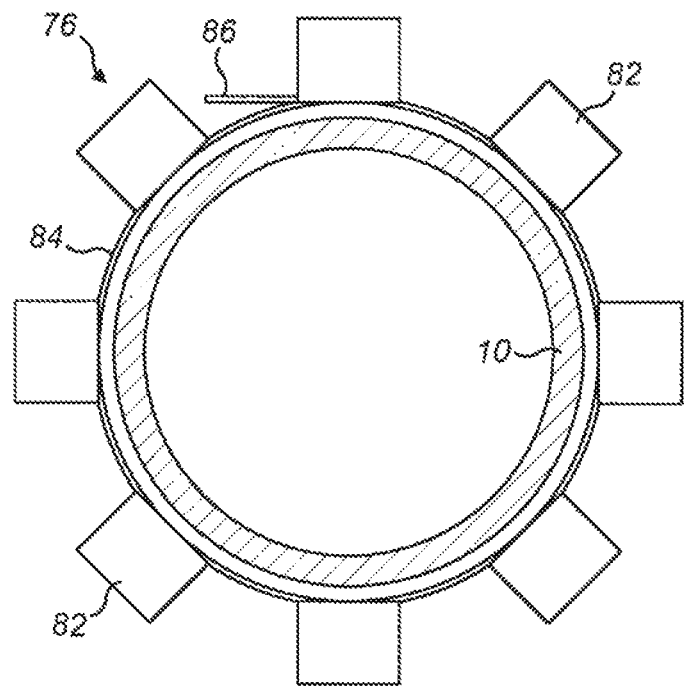
FIGS. 8 to 10 are schematic cross-sectional views of variant hang-off inserts of the invention surrounding an elongate element exemplified by a flexible pipe.

The hang-off insert 76 shown in FIG. 8 comprises support blocks 82 that are angularly spaced around a loop. The loop further composes a flexible steel band 84 that joins the support blocks 82 and maintains the mutual spacing between the support blocks 82. The band 84 can be tensioned and the circumference of the band 84 can be adjusted by pulling on an overlapping end 86 of the band 84 and locking the overlap, for example with a clamp (not shown) acting between overlapping portions of the band 84. Changing the circumference of the band 84 adjusts the effective inner circumference of the hang-off insert 76 by effecting radial movement of the support blocks 82.

The support blocks 82 may be fixed to the band 84 or may be slidable along the band 84 to adjust their mutual spacing when adapting the hang-off insert 76 to suit different elongate elements 10 with different diameters.

Here, the load-bearing duty of the hang-off insert 76 is performed by the support blocks 82 acting in combination. As in the preceding embodiment, the support blocks 82 have flat, parallel upper and lower faces that align and cooperate to define parallel, flat load-bearing support surfaces on the upper and lower sides of the hang-off insert 76. In this case, however, the load-bearing support surfaces are interrupted by the band 84 between the support blocks 82 and hence are discontinuous.

The hang-off insert 78 shown in FIG. 9 is a variant of the hang-off insert 76 shown in FIG. 8. The operation and construction of the hang-off inserts 76, 78 is largely similar, and like numerals are used for like parts. However, the hang-off insert 78 of FIG. 9 joins its support blocks 82 with a second flexible steel band 84 on the radially outward side of the first steel band 84. The doubled, radially-spaced bands 84 stiffen the hang-off insert 78.

Finally, the hang-off insert 80 shown in FIG. 10 has a fixed circumference and so joins its support blocks 88 with a ring 90 that is rigid, but that could instead be flexible or articulated. The ring 90 is suitably split or hinged to be placed around or removed from the elongate element 10. In this embodiment, the support blocks 88 are each in two parts, each comprising a body 92 fixed to the ring 90 and a pad 94 that is movable radially relative to the body 92, for example by a hydraulic actuator, a threaded mechanism or other actuation system such as an electric solenoid. Radially-inward movement of the pads 94 clamps the hang-off insert 80 around the elongate element 10. The extent of inward radial movement of the pads 94 can be varied to suit different elongate elements 10 of different diameters, hence adjusting the effective inner circumference of the hang-off insert 80.

Again, the load-bearing duty of the hang-off insert 80 is performed by the bodies 92 of the support blocks 88 acting in combination. As in the preceding embodiments, the bodies 92 of the support blocks 88 have flat, parallel upper and lower faces that align and cooperate to define parallel, flat load-bearing support surfaces on the upper and lower sides of the hang-off insert 80. However, it would be possible for the ring 90 that joins the support blocks 88 also to have flat, parallel upper and lower faces that align with the flat load-bearing support surfaces of the bodies 92. This would beneficially enlarge the load-bearing support surfaces and make them substantially continuous around the full circumference of the hang-off insert 80.

The invention claimed is:

1. A method of hanging-off a flexible elongate subsea element from a surface vessel, the method comprising:
    placing a hang-off insert onto a hang-off structure of the surface vessel, the hang-off insert comprising a substantially circular loop whose inner radius is defined by radially inner faces of support segments spaced circumferentially around the loop; and
    with the hang-off insert supported by the hang-off structure and the elongate subsea element extending through the loop, resting a laterally-protruding hang-off feature of the elongate subsea element on a substantially planar support face defined collectively by the support segments to transfer weight of the elongate subsea element suspended from the surface vessel to the hang-off structure,
    wherein the hang-off insert is flexible and the method comprises bending the flexible hang-off insert around the elongate subsea element to form the loop;
    the method further comprising:
    connecting together two parts of a connector to close the loop; and imparting, by a tensioning element, tension to the loop by forcing the two parts of the connector toward each other.

2. The method of claim 1, comprising securing together opposed ends of the flexible hang-off insert to close the loop.

3. The method of claim 1, comprising imparting tension in the loop by compressing the elongate subsea element within the loop.

4. The method of claim 1, comprising adapting the hang-off insert by adjusting the inner radius of the loop to suit an outer radius of the elongate subsea element.

5. The method of claim 4, comprising adjusting radial positions of at least the radially inner faces of the support segments to adjust the inner radius of the loop.

6. The method of claim 4, comprising effecting radial movement of pads of the support segments to adjust the inner radius of the loop.

7. The method of claim 4, comprising adjusting the inner radius of the loop by varying a length of at least one member between the support segments.

8. The method of claim 7, comprising varying circumferential spacing between at least two of the support segments when adjusting the inner radius of the flexible loop.

9. The method of claim 1, where the loop comprises a circumferential series of interengaged links that are added or removed to adjust the inner radius of the loop.

10. The method of claim 9, comprising allowing interengaged links to pivot relative to each other when closing the loop around the elongate subsea element.

11. The method of claim 10, wherein the interengaged links pivot about pivot axes that are generally orthogonal to the support face of the insert.

12. The method of claim 11, comprising engaging or disengaging links by relative movement between the links along the pivot axes.

13. The method of claim 12, comprising locking interengaged links against relative movement between the links along the pivot axes.

14. The method of claim 13, comprising engaging a retaining member with interengaged engagement formations of successive links to lock those links against relative movement along the pivot axes.

15. The method of claim 1, comprising adapting the hang-off insert by assembling the insert such that the inner radius of the loop suits an outer radius of the elongate subsea element.

16. A hang-off insert for hanging-off a flexible elongate subsea element from a hang-off structure of a surface vessel, the insert comprising:
    a substantially circular loop that can be placed around an elongate subsea element extending through the hang-off structure in use, the loop comprising a plurality of circumferentially spaced support segments that collectively define a substantially planar support face of the insert, the support segments each having a radially inner face oriented to face toward the elongate subsea element in use;
    wherein the radially inner faces of the support segments collectively define an inner radius of the loop; and
    at least the radially inner faces of the support segments are positionable at various radial positions with respect to a central axis of the loop to determine the inner radius of the loop,
    wherein the hang-off insert is flexible and can be bent around an elongate subsea element extending though the hang-off structure in use to form the loop,
    and wherein:
    the loop comprises a circumferential series of interengaged links that can be added or removed to adjust the inner radius of the loop;
    interlocking formations of the links are elongated in a direction that is generally orthogonal to the support face of the insert; and
    the links are engageable or disengageable with each other by relative movement between the links in said direction;
    and wherein:
    the loop comprises a connector having two parts that are connectable together to close the loop;
    and further comprising:
    at least one tensioning element arranged to impart tension to the loop by forcing the two parts of the connector toward each other.

17. The hang-off insert of claim 16, wherein the plane of the support face extends substantially orthogonally with respect to the central axis of the loop.

18. The hang-off insert of claim 16, wherein the connector is one of the support segments.

19. The hang-off insert of claim 16, wherein the links include the support segments.

20. The hang-off insert of claim 16, wherein the interlocking formations have substantially constant cross-sections in said direction.

21. The hang-off insert of claim 16, comprising a locking member acting between interengaged links to restrain relative movement between the links in said direction.

22. The hang-off insert of claim 16, wherein interengaged links are pivotable relative to each other.

23. The hang-off insert of claim 22, wherein the interengaged links are pivotable about pivot axes that are generally orthogonal to the support face of the insert.

24. The hang-off insert of claim 16, wherein each link comprises a tongue at one end and a complementary groove at an opposite end that face in mutually opposed circumferential directions when the links are assembled in the loop.

25. The hang-off insert of claim 16, wherein the substantially planar support face of the insert extends substantially continuously around the loop and between the support segments.

26. The hang-off insert of claim 16, wherein the support segments each comprise an upper face forming part of the support face of the insert and a lower face parallel to and spaced from the upper face, the spacing between the parallel upper and lower faces being substantially identical for each support segment.

27. The hang-off insert of claim 26, wherein members of the loop connecting the support segments each comprise an upper face forming part of the support face of the insert and a lower face parallel to and spaced from the upper face, the spacing between the parallel upper and lower faces being substantially identical for each support segment and for each member that connects the support segments.

28. The hang-off insert of claim 27, wherein the support segments extend radially outwardly with respect to the members that connect the support segments.

29. The hang-off insert of claim 16, wherein the loop comprises a flexible band.

30. The hang-off insert of claim 29, wherein the band is flexible to be bent in a plane that is orthogonal to the central axis of the loop and that is stiff to resist bending in directions that are orthogonal to that plane.

31. The hang-off insert of claim 16, wherein the support segments include radially movable pads that define the radially inner faces of the support segments.

\* \* \* \* \*